Figure 1:
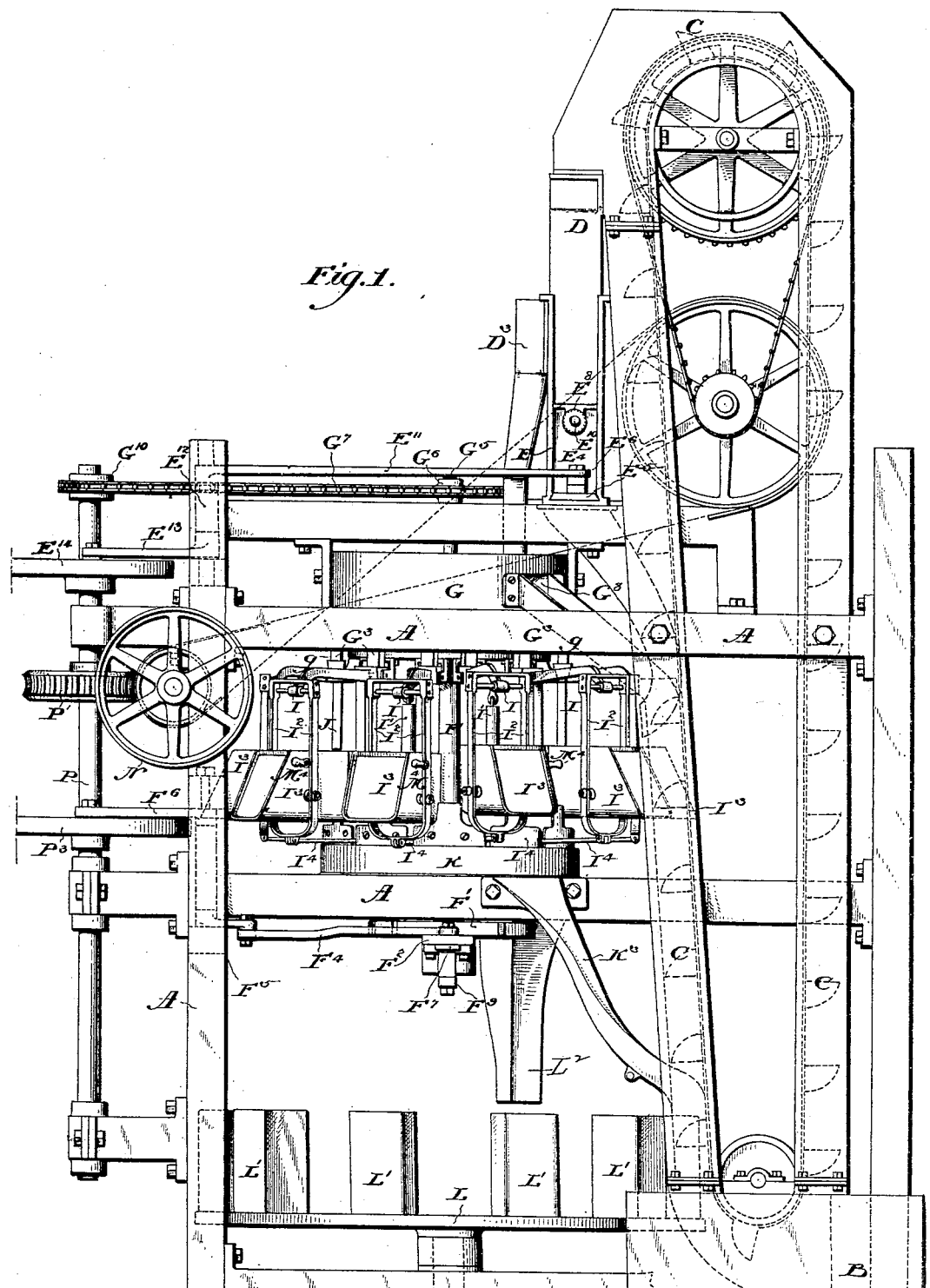

(No Model.) 7 Sheets—Sheet 1.

H. E. SMYSER.
AUTOMATIC WEIGHING MACHINE.

No. 493,796. Patented Mar. 21, 1893.

WITNESSES: David J. Williams, Walter Tamarisse
INVENTOR: Henry E. Smyser, by his atty. Francis T. Chambers (No Model.) 7 Sheets—Sheet 2.

H. E. SMYSER.
AUTOMATIC WEIGHING MACHINE.

No. 493,796. Patented Mar. 21, 1893.

WITNESSES: INVENTOR:

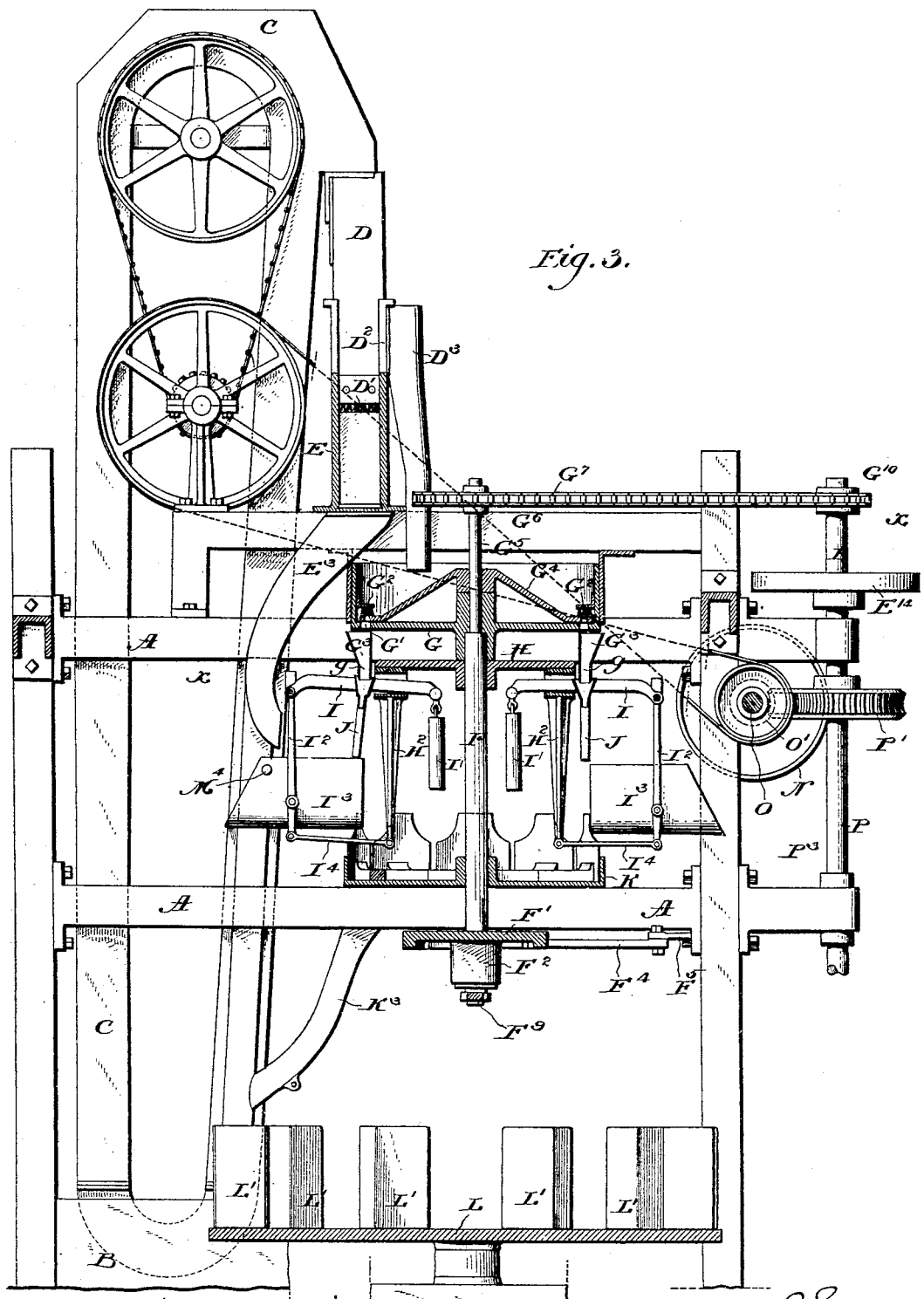

(No Model.) 7 Sheets—Sheet 4.
H. E. SMYSER.
AUTOMATIC WEIGHING MACHINE.

No. 493,796. Patented Mar. 21, 1893.

WITNESSES:
David S. Williams
Walter Tamariss

INVENTOR:
Henry E. Smyser
by his atty
Francis T. Chambers

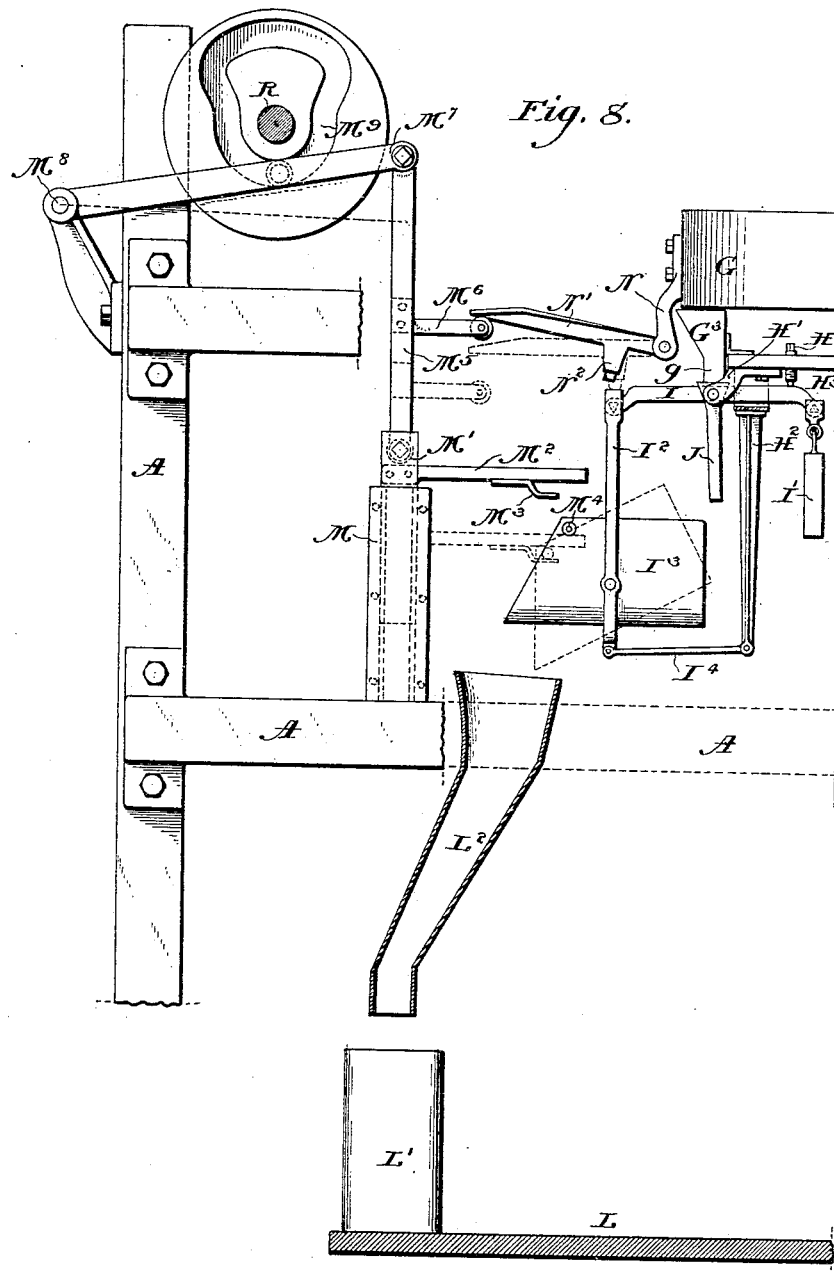

(No Model.)  7 Sheets—Sheet 6.
H. E. SMYSER.
AUTOMATIC WEIGHING MACHINE.

No. 493,796. Patented Mar. 21, 1893.

WITNESSES: INVENTOR:

(No Model.)  7 Sheets—Sheet 7.

H. E. SMYSER.
AUTOMATIC WEIGHING MACHINE.

No. 493,796. Patented Mar. 21, 1893.

WITNESSES:
David D. Williams
Walter Tamariss

INVENTOR:
Henry E. Smyser
by his atty.
Francis T. Chambers

UNITED STATES PATENT OFFICE.

HENRY E. SMYSER, OF PHILADELPHIA, PENNSYLVANIA, ASSIGNOR TO ARBUCKLE BROTHERS, OF NEW YORK, N. Y.

AUTOMATIC WEIGHING-MACHINE.

SPECIFICATION forming part of Letters Patent No. 493,796, dated March 21, 1893.

Application filed May 22, 1891. Serial No. 393,678. (No model.)

*To all whom it may concern:*

Be it known that I, HENRY E. SMYSER, of the city and county of Philadelphia, State of Pennsylvania, have invented a certain new and useful Improvement in Automatic Weighing-Machines, of which the following is a true and exact description, reference being had to the accompanying drawings, which form a part of this specification.

My invention relates to automatic weighing machines and especially machines of the general character shown and described in my patents of March 31, 1891, Nos. 449,275 and 449,276.

My present invention also embraces some features which form in part the subject-matter of my pending application for Letters Patent filed April 15, 1891, Serial No. 389,030.

The said patents of March 31, 1891, illustrate an automatic weighing machine wherein the material to be weighed is delivered first to a measuring device which acts to measure out in bulk charges of the material having a weight somewhat less than the full weight desired; these charges are dumped at intervals into the pans of two weighing scales which receive the charges in alternation; a supplemental feed of the material is provided for each scale serving to feed a regulated stream thereof into the scale pan after the latter has received the measured charge, until upon receiving its full weight the scale pan descends and the supplemental feed is cut off by diverting the feed-chute so that it discharges outside the scale pan; and finally the scale pan is dumped, the weighed quantity of material being discharged down a chute to be filled into packages, and the two scales dumping alternately. In the practical use of this machine in connection with mechanism for automatically packaging the weighed charges, it was found that where close or accurate weighing was required, the two scales required so much time in which to do their work that the packaging mechanism could not be worked to its full capacity; or in other words, if the machine were driven to the full capacity of the packaging mechanism, it would be necessary to so adjust the weighing mechanism as to supply the supplemental feed to the scales in such volume in order to sufficiently hasten their operation, that the weighing could not be performed with the desirable degree of accuracy. Where two scales are employed in such a machine, each does its work of weighing within the limit of time during which two packages are filled; in order to insure greater accuracy, it is desirable to give each scale as much time in which to do its work as that corresponding to the interval during which from eight to ten or twelve packages are being filled, the time interval varying according to the material under treatment and the accuracy of weight desired. To accomplish this result is the purpose of my present invention.

Instead of employing two stationary scales working in alternation, my present invention provides a revolving series of scales receiving the measured charges one after the other in one position, swinging around therefrom during nearly an entire revolution during which they receive the supplemental feed and effect the weighing, and being finally dumped one after another at near the end of the revolution. By preference the scales revolve intermittently, the measuring device delivering the measured charges to them in their initial stopping position through a stationary chute, and the dumping mechanism being arranged to act upon them in their final stopping position to discharge their contents successively into another stationary chute.

My invention also introduces certain other improvements which will be hereinafter set forth.

The nature of my invention will be best understood as described in connection with the drawings in which it is illustrated and in which,—

Figure 2:
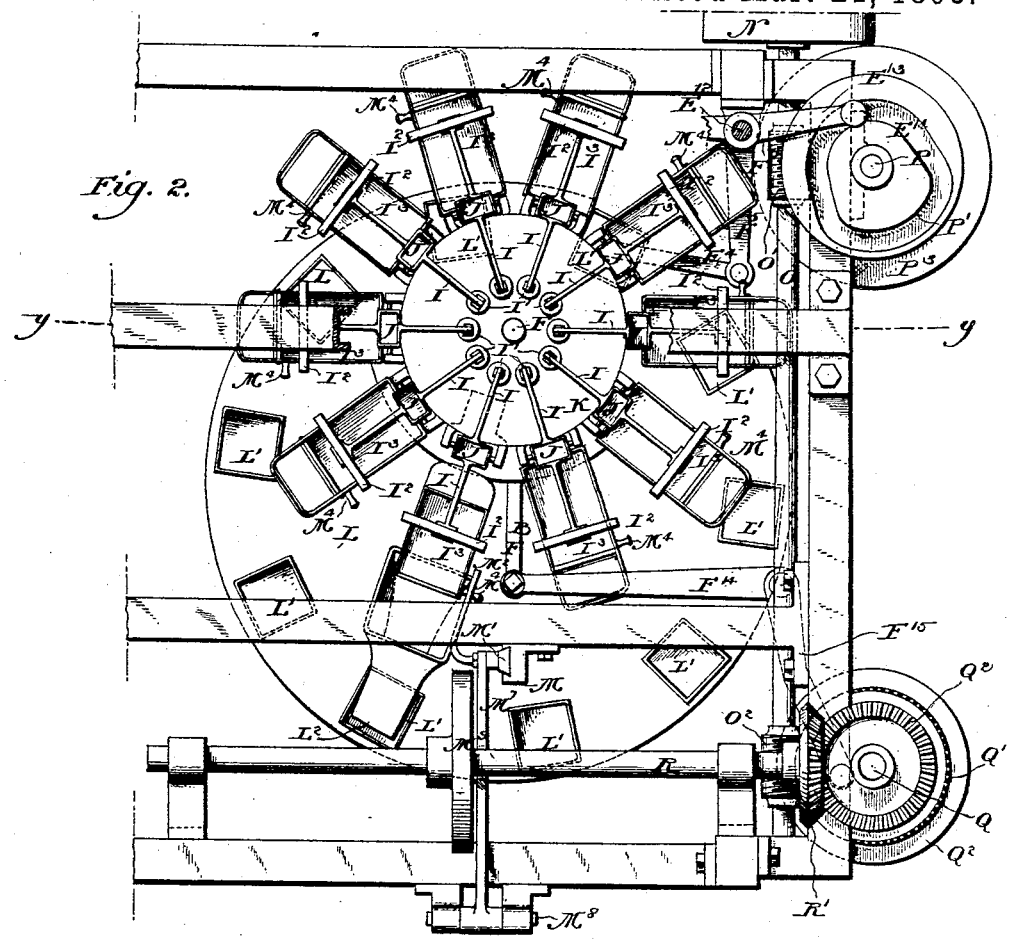
Figure 7:
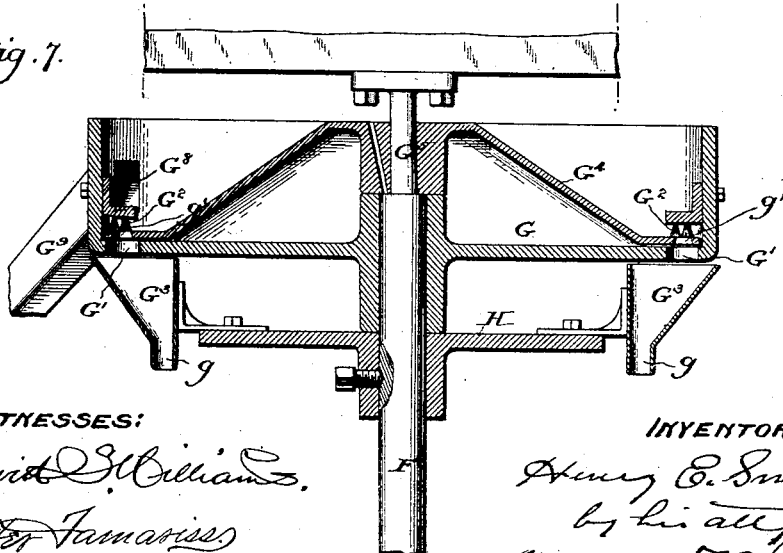
Figure 4:
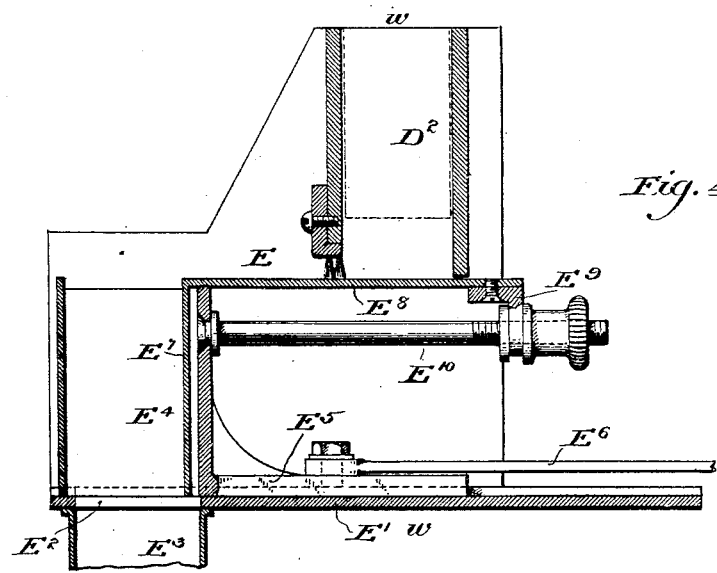
Figure 5:
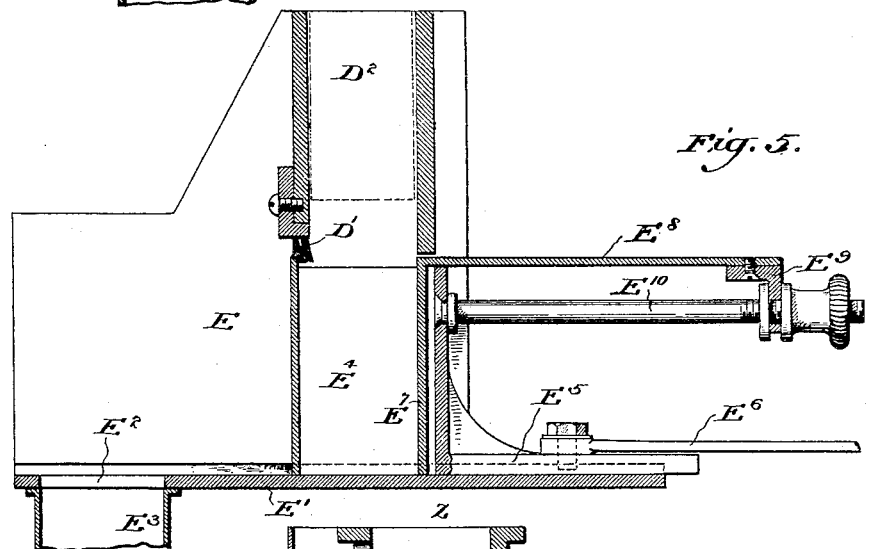
Figure 6:
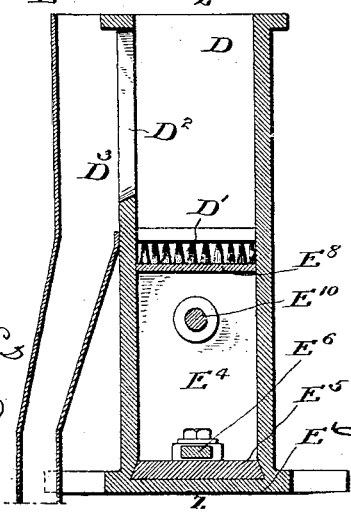
Figure 9:
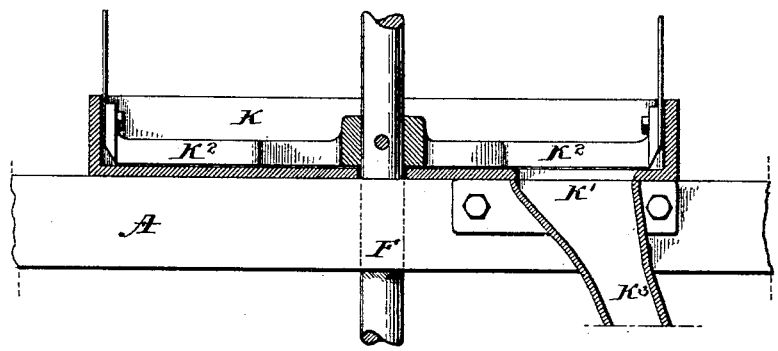
Figure 10:
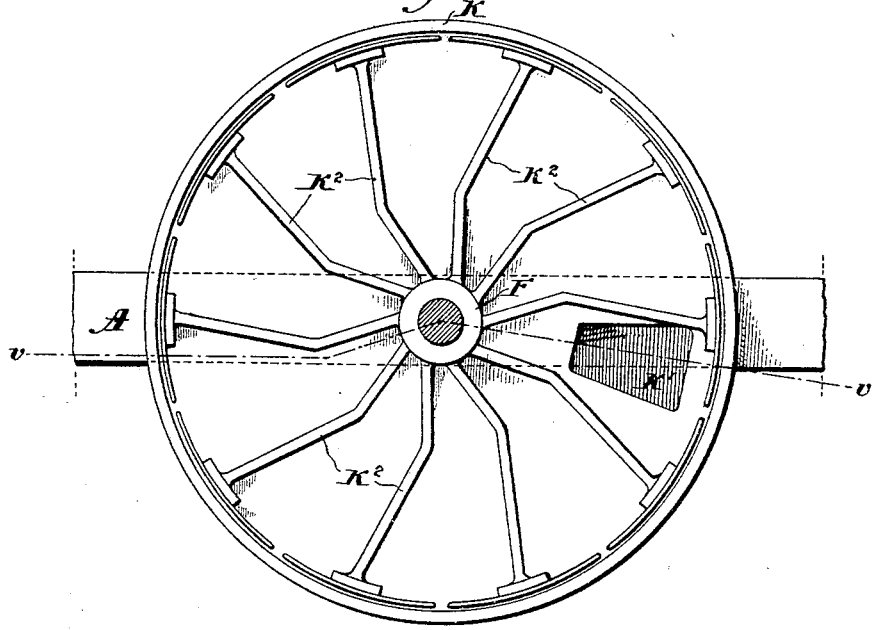
Figure 13:
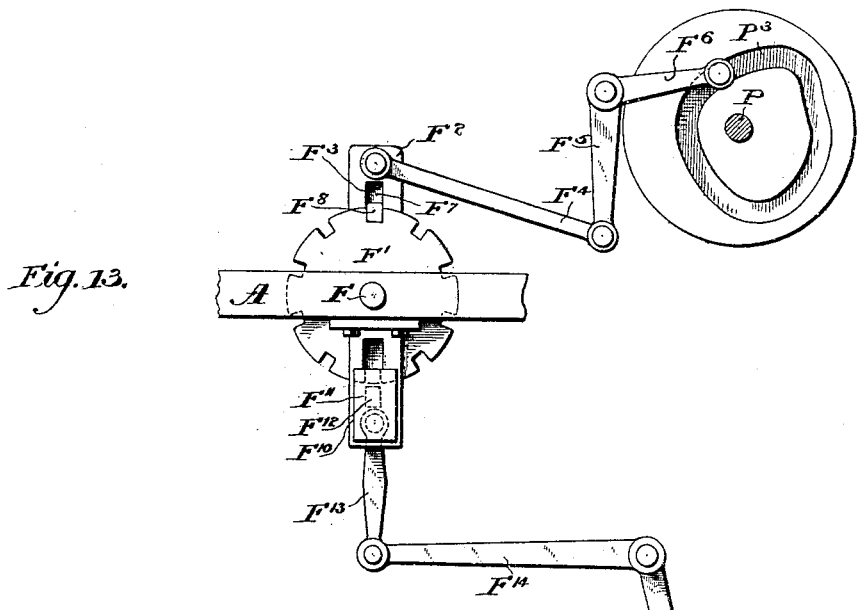
Figure 14:
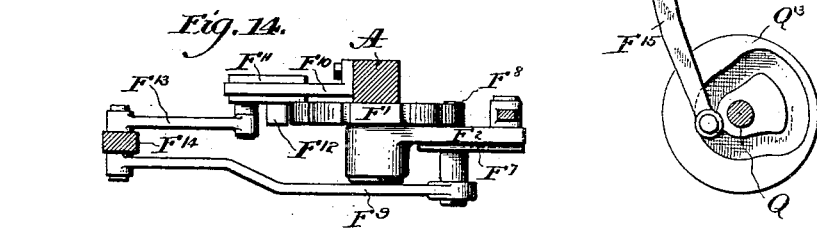
Figure 11:
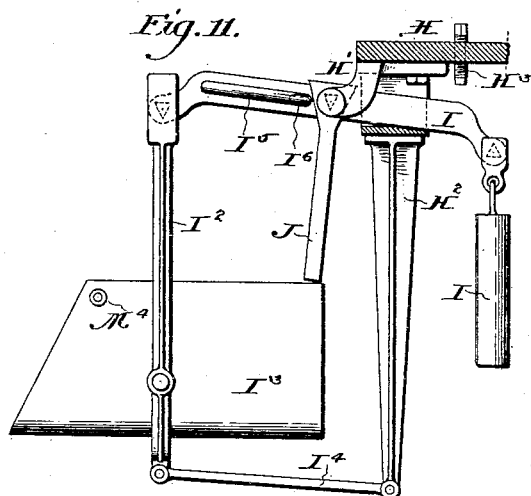
Figure 12:
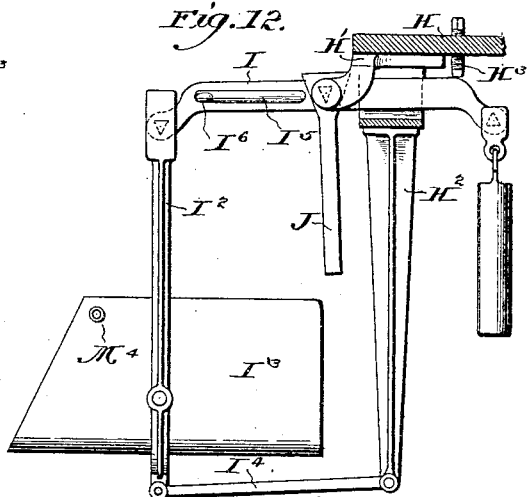

Figure 1 is an elevation of the machine. Fig. 2 a plan view taken on the irregular section-line $xx$ of Fig. 3. Fig. 3 a cross-sectional view taken on the line $yy$ of Fig. 2 and from an opposite direction to the elevation shown in Fig. 1. Figs. 4 and 5 are cross-sectional views taken on the line $zz$ of Fig. 6 and showing the main feeding device in two different positions. Fig. 6 is a cross-section on the line $ww$ of Fig. 4. Fig. 7 is a central cross-section through the supplemental feeding device shown in similar section and on smaller scale in Fig. 3. Fig. 8 is an elevation of the mechanism for dumping the scale-pans and other devices co-acting with such mechanism. Fig. 9 is a sectional elevation of a receiving pan forming part of my machine taken on the line $v\ v$ Fig. 10. Fig. 10 is a plan view of the device shown in Fig. 9. Figs. 11 and 12 are elevations showing the scales and attached mechanism in two different positions. Fig. 13 is a plan view of the mechanism for actuating the central shaft of the machine; and Fig. 14 an elevation of the said mechanism.

Referring to the drawings, let A designate the frame of the machine, being of any suitable construction to sustain the working parts, B (see Fig. 1) a receptacle for material to be weighed, C an elevator for lifting such material therefrom and discharging it down a chute D, E a measuring device receiving the material from the chute D and acting to deliver measured charges thereof at regular intervals, which charges are directed down a chute $E^3$ (Fig. 3) and dropped into the scale pan $I^3$ of the scale I standing momentarily beneath said chute. The scales I, of which ten are shown in the drawings, are carried by a carrier disk H fixed on an intermittently revolving vertical shaft F, so that the scales are carried around step by step from the initial position beneath the chute $E^3$ to the final position over the discharge chute $L^2$ (Figs. 1 and 8). In this latter position the scale pan is dumped by the downward movement of an arm or finger $M^2$ (Fig. 8) which tilts the pan to the position shown in dotted lines. During the intermittent rotation of the scales from the initial or receiving to the final or dumping position, each scale receives a graduated flow of material from a supplemental feed consisting of a circular hopper G to which material is continually supplied, and from which it is regularly discharged through perforations in a continuously revolving feed disk $G^4$ (Fig. 7), the streams of material discharged from the hopper being caught in revolving chutes $G^3\ G^3$ carried by the carrier H, and terminating in contracted throats $g\ g$, from which the material discharged into chutes J J carried by the respective scale beams and moving therewith, so that so long as the scale pan is under weight the chute J delivers the material thereinto as shown in Fig. 11, but upon the descent of the pan under the full weight, the chute J is deflected and discharges the material outside of the pan, as shown in Fig. 12. As each scale has nearly an entire revolution in which to receive the supplemental feed and attain the full weight, this feed may be reduced to a mere dribble, and thereby great sensitiveness and accuracy may be imparted to the scales.

I will now describe more particularly the details of the apparatus. The chute D from the elevator C enters the upper part of the measuring device E, which consists of a box having a bottom $E'$ over which reciprocates a slide $E^5$ formed with a measuring box or compartment $E^4$, which by mechanism hereinafter described is given a reciprocating motion from a position beneath the chute $D^2$ as shown in Fig. 5, to a position over a discharge opening $E^2$ through the bottom $E'$ communicating with the discharge chute $E^3$. The box E is preferably provided with a brush $D'$ at the base of the chute D (Fig. 5). In the side of the chute D is formed an opening $D^2$ (Fig. 6) which discharges the excess of material down a chute $D^3$ (Fig. 3) to supply the supplemental feed hopper G. The slide $E^5$ is actuated through a connecting rod $E^6$ by the arm $E^{11}$ attached to rock-shaft $E^{12}$ which shaft is given a proper oscillatory movement by means of the cam $E^{14}$ acting on the arm $E^{13}$ attached to the lower part of the rock-shaft.

$E^8$ (Figs. 4 to 6) is a plate extending from the rear edge of the box $E^4$ backward and serving to close the chute D when the measuring box is thrust forward from beneath it. As shown the plate $E^8$ has attached to it a downwardly-extending tongue $E^7$ and is made adjustable having a downwardly-extending lug $E^9$ which is engaged as shown in Figs. 4 and 5 with a nut screwing on the end of a rod $E^{10}$; in this way the contents or volume of the box $E^4$ may be varied.

In all of the above particulars the measuring device shown is identical with that exhibited in my patents of March 31, 1891.

The shaft F (see Fig. 3) is secured in suitable bearings and has at its lower end a notched or slotted disk $F'$; journaled on this shaft or concentric thereto is a rock-lever $F^2$ (see Figs. 13 and 14) having a guide $F^3$ in its face and having an oscillatory movement given to it at intervals by means of a cam $P^3$ attached to shaft P and acting on the arm $F^6$ of a rock-lever the other arm $F^5$ of which is connected to the lever $F^2$ by a rod $F^4$. A slide $F^7$ moves in the guide slot $F^3$ and has attached to it a bolt or tooth $F^8$; on the opposite side of the wheel $F'$ is a stationary guide $F^{10}$ in which moves a slide $F^{11}$ having attached to it a bolt or tooth $F^{12}$; the two bolts $F^8$ and $F^{12}$ are arranged at a distance apart somewhat less than the exterior diameter of the slotted disk or wheel $F'$; and the two slides supporting the teeth are connected by links $F^9$ and $F^{13}$ with an arm $F^{14}$ of a bell-crank lever, the other arm, $F^{15}$, of which is actuated by the cam $Q^3$ on the shaft Q.

The operation of the device is as follows: The bolt $F^8$ being engaged with a notch in disk $F'$ the cam $P^3$ acting through the levers described causes the rock-lever $F^2$ to move through an angular distance equal to the distance between adjacent notches on the disk. Having made this stroke the rock-lever $F^2$ remains stationary while the cam $Q^3$ acting through the lever and links described pushes the bolt $F^{12}$ into engagement with a notch on the disk $F^2$ and pushes at the same time the bolt $F^8$ out of engagement with the disk; the lever $F^2$ is then drawn back to its original position the disk being in the meantime held stationary and at a proper interval the cam $Q^3$ again acts drawing the bolt $F^{12}$ out of engagement and the bolt $F^8$ into engagement with the disk $F^2$; another angular movement of the disk and shaft ensues and so on indefinitely.

The supplemental feed hopper G (Figs. 3 and 7) is a circular stationary box or receptacle at the upper end of the shaft F; around the periphery of the box are a series of openings $G'$ extending through its bottom above which are secured brushes $G^2$; beneath the box is an annular receptacle $G^3$ arranged to receive any material falling through the openings $G'$ and having a series of spouts $g\ g$ extending from its bottom at intervals corresponding to the number of notches in the disk $F^2$ and the number of scale-pans in the series. The receptacle $G^3$ is secured to a carrier disk or plate H which, in turn, is fastened to and rotates with the shaft F. On the inside of the box G is a cone-shaped feed-disk $G^4$ with a flat annular rim fitting down upon the bottom of the box G and having formed in it a series of perforations $g'$ adapted to register with the openings $G'$ around the edge of box G; the disk $G^4$ is secured to a shaft $G^5$ concentric with shaft F said shaft $G^5$ having a sprocket-wheel $G^6$ (Fig. 3) at its top and being rotated by means of the drive-chain $G^7$ passing over the said sprocket-wheel $G^6$ and a sprocket-wheel $G^{10}$ on the shaft P; an opening $G^8$ (Fig. 7) in the side of box G leads into a chute $G^9$ which, as shown in Fig. 1, leads into the elevator C. Material is fed to the box G through the chute $D^3$ and falling on the inclined face of the rotating plate $G^4$ slides down on to its flat rim entering the perforations $g'$ and the material contained in these perforations being separated from the rest by the brushes $G^2$ and falling through the perforations $G'$ into the annular receptacle $G^3$ from which it escapes through the spouts $g$. I might here mention that the receptacle $G^3$ instead of being a continuous trough may be divided up into a series of compartments having converging sides leading to each spout $g$. To the plate H are secured (as shown in Figs. 3, 11 and 12) a series of symmetrically-disposed hangers $H'$ and downwardly-extending rods $H^2$ equal in number to the notches in the disk $F'$; upon the hangers $H'$ are supported the scale beams I from one end of which by means of rods $I^2$ are suspended scale-pans $I^3$ and from the other end of which are suspended counterweights $I'$. The hanger rods $I^2$ which sustain the scale-pans are steadied by means of link $I^4$ pivotally connected with the said rods and with the rods $H^2$. Connected with the scale-beam is a chute J the mouth of which lying flush or nearly so with the scale beam is situated directly beneath a spout $g$ (see Fig. 3) and the lower end of which when the scale is overbalanced by its counterweight extends within the scale-pan as shown in Fig. 11 and, when the scale descends extends out behind the scale-pan as shown in Fig. 12; when in the last-mentioned position the material falling through chute J is received in a box K (Fig. 3) which surrounds the shaft F and in which are a series of arms $K^2$ (Figs. 9 and 10) moving with the shaft and which, sweeping over the bottom of the box, carry the material to an opening $K'$ through which it falls to a spout $K^3$ and thence to the elevator C as shown in Fig. 1. Beneath the series of scale-pans is a rotating table L upon which packages $L'$ are carried. The table L (Figs. 1, 2 and 3) has an intermittent rotary movement and may be constructed and actuated as described in my patent, No. 449,275, of March 31, 1891. A chute $L^2$ (Figs. 1 and 8) is arranged to receive the contents of the scale-pans and convey it into the packages $L'$.

I will here note that the chute $E^3$ is brought down so that its lower end will register with and deliver material to the scale-pans seriatim at one of the points at which they rest in their intermittent rotary motion (see Fig. 3). Having received this charge of measured material which is regulated so as to be somewhat less than the desired quantity, the scale-pans move away from the chute in their circular path and as they move continue to receive a gradual supply of material from the box G and through the chutes $g$ and the chutes J. When the weight of material in the scale-pan is sufficient to overcome the counterweight the pans move downward from the position shown in Fig. 11 to that shown in Fig. 12 the chutes J moving with the scale-beam and in the new position the material falling from the box G no longer passes to the scale-pan but is delivered to the receptacle K and returned to the elevator C. The downward motion of the scale-pan is regulated by the stop $H^3$ (see Figs. 8, 11 and 12). In Figs. 11 and 12 I have shown a device for quickening the downward motion of the scale-pan after it has attained its determined charge. This consists of a guide $I^5$ secured to and extending parallel with the scale-beam and a moving weight $I^6$ secured in said guide and movable in it from one extremity to the other. Preferably the guide is a tube and the weight a small quantity of mercury. It will be seen of course that as long as the scale beam is in the position shown in Fig. 11 the weight will remain at rest near the fulcrum of the beam and that as soon as the scale beam assumes a downward inclination the weight will move to the other extremity of the guide thus increasing the total weight tending to draw the scale-beam down and causing the beam to move with greater rapidity. The advantage of this device lies in the fact that it insures a more rapid cut-off of the supply coming from the chute J.

I will here call attention to the fact that the device of the chute J connected with the scale-beam for supplying material to the scale-pan is but one of many well-known devices for causing the motion of the scale-beam to effect the cut-off or deflection of the supply of material to the pan and it will be understood that except where my claims are expressly limited to the specific construction shown I do not intend to limit myself to the use of any one particular kind of device for effecting and cutting off the supplemental feed to the pans.

The mechanism for dumping the scale-pans into the chute $L^2$ is best shown in Fig. 8 in which M is a guide and M' a slide moving in said guide and actuated through a rod $M^5$ and lever $M^7$ pivoted at $M^8$ by a cam $M^9$ engaging the lever $M^7$. From the slide M' extends an arm $M^2$ which, at proper intervals, is caused to move downward pressing upon a roller or lug $M^4$ on the scale-pan and causing it to tilt and dump its load as shown in dotted lines in Fig. 8. A supplemental finger $M^3$ secured to the bottom of arm $M^2$ engages the lug $M^4$ at its under side so that as the slide moves up the scale is thrown back to its original position. In order to prevent a jar from the effect of the counterweight I' drawing up the emptied scale-pan too rapidly I provide a finger or weighted lever N' hinged to a lug N extending from the box G and having a projection $N^2$ which extends over the end of the scale-beam. A finger $M^6$ on the rod $M^5$ is arranged to engage the finger N' and hold it in a position where it will not come in contact with the scale-beam; when, however, the rod $M^5$ is pushed down to effect the dumping of the scale-pan the rod $M^6$ permits the finger N' to fall until its end $N^2$ comes in contact with the scale-beam and rests upon it, the weight of the finger being sufficient to overcome that of the counterweight when added to the weight of the emptied pan and its attachments. Consequently the pan does not rise after being dumped until the rod $M^5$ rises when the gradual upward motion of the finger N' permits the pan to resume the position shown in Fig. 11 gradually and without shock.

The means for upholding a scale-beam or pan while dumping its charge into it; and the means for holding down the beam or pan while dumping the weighed charge out of it, are not broadly claimed in my present application, being claimed generically in my application, Serial No. 389,030, filed April 15, 1891. In my present application these features are claimed only in their combination with or special adaptation to the specifically-different weighing mechanism herein claimed.

Having now described my invention, what I claim as new, and desire to secure by Letters Patent, is—

1. The combination with an intermittently-revolving series of scales, of an intermittently-discharging measuring device comprising a measuring box and mechanism for filling it and discharging it, and a chute leading therefrom to one of the stopping points in the travel of the scales, so that the scale-pans receive the measured charges at said point in succession, and means for feeding additional material to the scales to bring the charges to full weight.

2. The combination with an intermittently revolving series of scales, of an intermittently discharging measuring device delivering charges to the scales in succession, means for feeding additional material to the scales to bring the charges to full weight, and a dumping device for dumping the scales in turn as they reach one of their stopping positions.

3. The combination of an intermittently revolving carrier, a series of scales carried thereby, a feeder hopper mounted above said scales, chutes leading down therefrom, for feeding a regulated supply to the scales, and a movable chute for each scale, arranged to receive the material from said hopper and connected to the scale beam to be deflected by the descent of the pan, so as to deliver into the pan when the latter is under weight and outside the pan when it is full weight.

4. In an automatic weighing machine, a circular hopper having outlet openings in its bottom near its periphery, chutes beneath receiving the discharge from said openings, a supply chute delivering material into said hopper, a revolving feed-disk in said hopper formed with a conical central portion sloping downwardly and outwardly to the bottom, and with an outer rim covering the openings in the hopper bottom and having perforations, and brushes mounted in the hopper over said rim, whereby the material delivered onto said sloping disk is directed outwardly and enters the perforations in said rim.

5. In an automatic weighing machine, the combination of a circular intermittently-rotating series of scales, a series of chutes J attached to the scale-beams as described, a circular feed hopper over said scales, having discharge openings in its bottom, revolving chutes receiving the material from said openings, and conducting it to said chutes J, and a revolving feed-disk in said hopper having perforations through which the material feeds into said openings and passes to the scales.

6. In combination with a series of intermittently-rotating scales and a dumping device arranged to engage and dump each scale-pan in turn, of a device for preventing the premature ascent of the empty pan consisting of a vertically movable piece arranged over the scale at the dumping point, and mechanism for actuating said piece to move it down before the emptying of the pan so that it shall hold the beam and to lift it gradually after the pan is emptied.

7. In combination with a series of intermittently-rotating scales, a dumping device consisting of a finger $M^2$ arranged to engage and dump each scale-pan in turn, a device for preventing the premature ascent of the empty pan consisting of a finger N' arranged to come over the scale at the dumping point, a lifter $M^6$ connected with finger $M^2$ so as to move with it and arranged to act on finger N' as described lowering it onto the scale-beam when the finger $M^2$ moves to dump the scale and lifting it after the scale is dumped.

8. In an automatic weighing machine, the combination with an intermittently-rotating shaft or mechanism for imparting to it its intermittent movements consisting of a disk on said shaft having as many slots as the number of its movements in a revolution, a rock-lever, a bolt carried by said lever adapted to enter said slots, a locking bolt movable in stationary bearings and adapted to engage and lock said disk, a driving shaft and interposed mechanism for swinging said lever and for engaging and disengaging said bolts, adapted to engage the bolt on said rock-lever with the disk and hold it engaged during the forward vibration of said lever, and to engage said locking bolt and hold it engaged during the return vibration of said lever, whereby the shaft is positively propelled, and positively locked in position during the intervals between the propulsive movements.

9. In an automatic weighing machine, the combination of a shaft F carrying a series of circularly-arranged receptacles, with mechanism for giving it an intermittent rotary motion consisting of a notched disk $F'$, a rock-lever $F^2$ pivoted on or concentric with the shaft, mechanism for intermittently-moving the rock-lever as described, a bolt $F^8$ guided in lever $F^2$, a stationary guide $F^{10}$ arranged opposite lever $F^2$, a bolt $F^{12}$ having bearings in said guide, and intermittently acting mechanism connected with bolts $F^8$ and $F^{12}$ arranged as described to engage them alternately with notches in disk $F'$, substantially as and for the purpose specified.

10. In a weighing mechanism, the combination with a circular series of scales, means for supplying them, and a movable chute for each scale, through which the material is supplied thereto, connected to the scale beam to be deflected by the descent of the scale-pan so as to deliver into the pan when the latter is underweight, and outside the pan when it is full weight, of a box beneath the scales for receiving the material falling outside the pans, having a discharge opening, and a revolving arm adapted to sweep the material accumulating in said box into said opening.

H. E. SMYSER.

Witnesses:
JAMES S. PHILLIPS,
JOSHUA MATLACK, Jr.